United States Patent [19]

Mühlbauer et al.

[11] 4,452,433
[45] Jun. 5, 1984

[54] CARRYING TOWER ARRANGEMENT FOR A METALLURGICAL VESSEL

[75] Inventors: Gerhard Mühlbauer, Steyr; Franz Kagerhuber, Hörsching; Werner Glatz, Enns; Erich Felbermayer, Wels; Leo Kim, St. Florian, all of Austria

[73] Assignee: Voest-Alpine Aktiengesellschaft, Linz, Austria

[21] Appl. No.: 432,431

[22] Filed: Oct. 4, 1982

[30] Foreign Application Priority Data

Oct. 9, 1981 [AT] Austria ................... 4346/81

[51] Int. Cl.³ .............................................. B25J 11/00
[52] U.S. Cl. ................... 266/142; 164/438; 414/744 R; 266/276
[58] Field of Search ............... 266/245, 276, 275, 277, 266/142, 143, 244; 164/437, 438, 336, 337, 412; 294/67 DC; 222/168, 168.5; 414/744 R

[56] References Cited

U.S. PATENT DOCUMENTS

| | | |
|---|---|---|
| 3,556,349 | 1/1971 | Niskovskikh ................ 164/438 |
| 3,869,055 | 3/1975 | Peltier et al. ................ 414/744 R |
| 3,894,576 | 7/1975 | Schoffmann ................ 222/168 |
| 3,942,650 | 3/1976 | Peytavin ..................... 214/1 BC |
| 4,056,197 | 11/1977 | Peytavin ..................... 214/1 BC |
| 4,286,738 | 9/1981 | Blum .......................... 222/591 |

FOREIGN PATENT DOCUMENTS

| | | |
|---|---|---|
| 355747 | 2/1975 | Austria . |
| 1964231 | 12/1969 | Fed. Rep. of Germany . |
| 1965744 | 7/1971 | Fed. Rep. of Germany ...... 164/438 |
| 2937855 | 9/1979 | Fed. Rep. of Germany . |
| 1224913 | 3/1971 | United Kingdom ........... 164/438 |

Primary Examiner—L. DeWayne Rutledge
Assistant Examiner—S. Kastler
Attorney, Agent, or Firm—Brumbaugh, Graves, Donohue & Raymond

[57] ABSTRACT

A carrying tower for a metallurgical vessel includes at least one carrying arm cantilevering from a non-rotatable carrying column and pivotable about the carrying column, which carrying arm carries at least one metallurgical vessel. A pivot bearing is provided between the carrying arm and the carrying column. In order to enable a simple check, maintenance and a quick removal of the pivot bearing with the carrying arm remaining on the carrying tower, a single pivot bearing accommodating axial and radial forces as well as tilting moments, with a lower-side shoulder of a first bearing race, rests on a supporting surface arranged on the upper end of the carrying column. The carrying arm is mounted so as to be suspended on a second bearing race of the pivot bearing.

6 Claims, 3 Drawing Figures

CARRYING TOWER ARRANGEMENT FOR A METALLURGICAL VESSEL

BACKGROUND OF THE INVENTION

The invention relates to a carrying tower for a metallurgical vessel, in particular for a casting ladle at a continuous casting plant, comprising at least one carrying arm cantilevering from a non-rotatable carrying column and pivotable about the carrying column, which carrying arm carries at least one metallurgical vessel, a pivot bearing being provided between the carrying arm and the carrying column.

A carrying tower of this kind is known from Austrian Pat. No. 355,747. Since the arrangement of a continuous casting plant in a steel making plant mostly is designed such that the carrying tower is arranged in the region of the crane shadow between a casting crane of the casting hall and a mounting crane in the adjacent finishing hall, every manipulation of larger parts of the carrying tower involves difficulties; in most cases, the utilization of both cranes simultaneously by using special suspensions is necessary.

It is also possible to use a mobile crane for this purpose, wherein it may, however, frequently be necessary to remove part of one of the two craneways and corresponding conduits in order to reach the lifting heights necessary for the mobile crane and to provide a free space for it.

Both the utilization of the two big cranes simultaneously and the utilization of a mobile crane involve great expenditures in terms of time and work.

A part of the carrying tower that calls for intensive maintenance is the pivot bearing between the carrying arm and the carrying column. If one wishes to lay this pivot bearing open—for the purpose of inspection, maintenance or exchange—this is possible with the known carrying tower only after removal of the carrying arm. The carrying arm must be lifted off the carrying tower and deposited elsewhere before getting to the pivot bearing.

SUMMARY OF THE INVENTION

The invention aims at avoiding these disadvantages and difficulties, and has as its object to provide a carrying tower of the initially defined kind with which a simple inspection, maintenance and a simple and quick removal of the pivot bearing are possible without having to use a big crane and wherein the carrying arm may remain on the carrying tower, i.e., need not be lifted off the carrying tower and removed therefrom.

This object is achieved according to the invention in that a single pivot bearing, accommodating axial and radial forces as well as tilting moments, with a lower-side shoulder of a first bearing race, rests on a supporting surface arranged on the upper end of the carrying column and the carrying arm is mounted so as to be suspended on a second bearing race of the pivot bearing.

According to a preferred embodiment a supporting element having a circularly-ring-shaped supporting surface and preferably designed as an annular flange rests on an upper-side shoulder of the second bearing race, the carrying arm being mounted so as to be suspended on a flange-like part of the supporting element projecting radially outwardly beyond the pivot bearing.

Suitably, the carrying arm is mounted to the flange-like part of the supporting element by means of tension screws, mounting and dismounting thus being particularly simple.

According to an advantageous embodiment, the carrying arm is mounted to the flange-like part of the supporting element by means of a bayonet-type connection, wherein lugs overlapping the flange-like part of the supporting element are provided on the carrying arm, mounting and dismounting of the pivot bearing thus being feasible particularly quickly.

Advantageously, a roller pivot connection is provided as pivot bearing, whose bearing inner race is screwed with the non-rotatable carrying column and whose bearing outer race is screwed with the supporting element.

BRIEF DESCRIPTION OF THE DRAWINGS

The invention will now be explained in more detail with reference to the accompanying drawings, wherein.

DETAILED DESCRIPTION OF THE INVENTION

Figure 1:
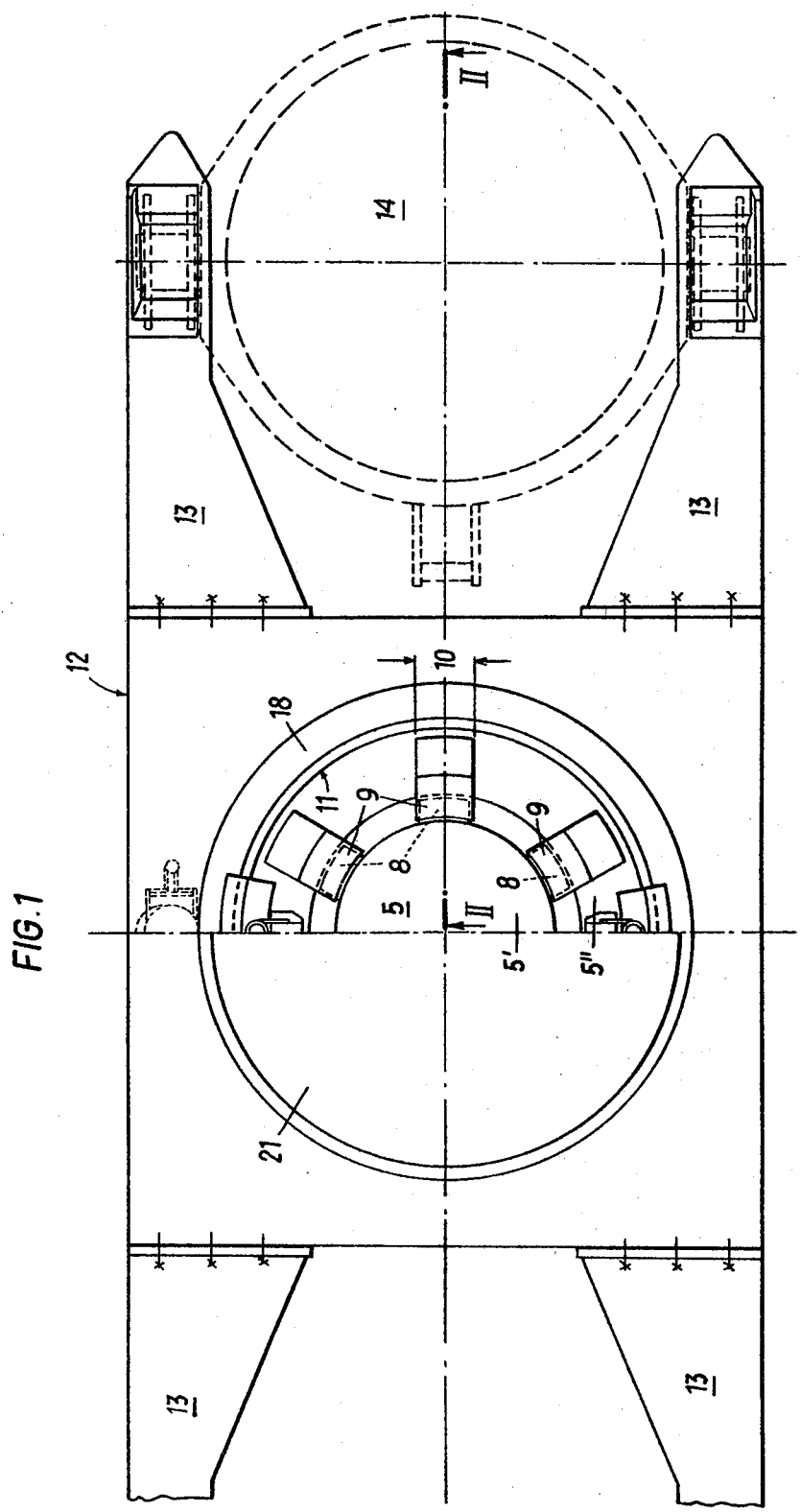
FIG. 1 is a top view of the carrying tower according to the invention.
Figure 2:
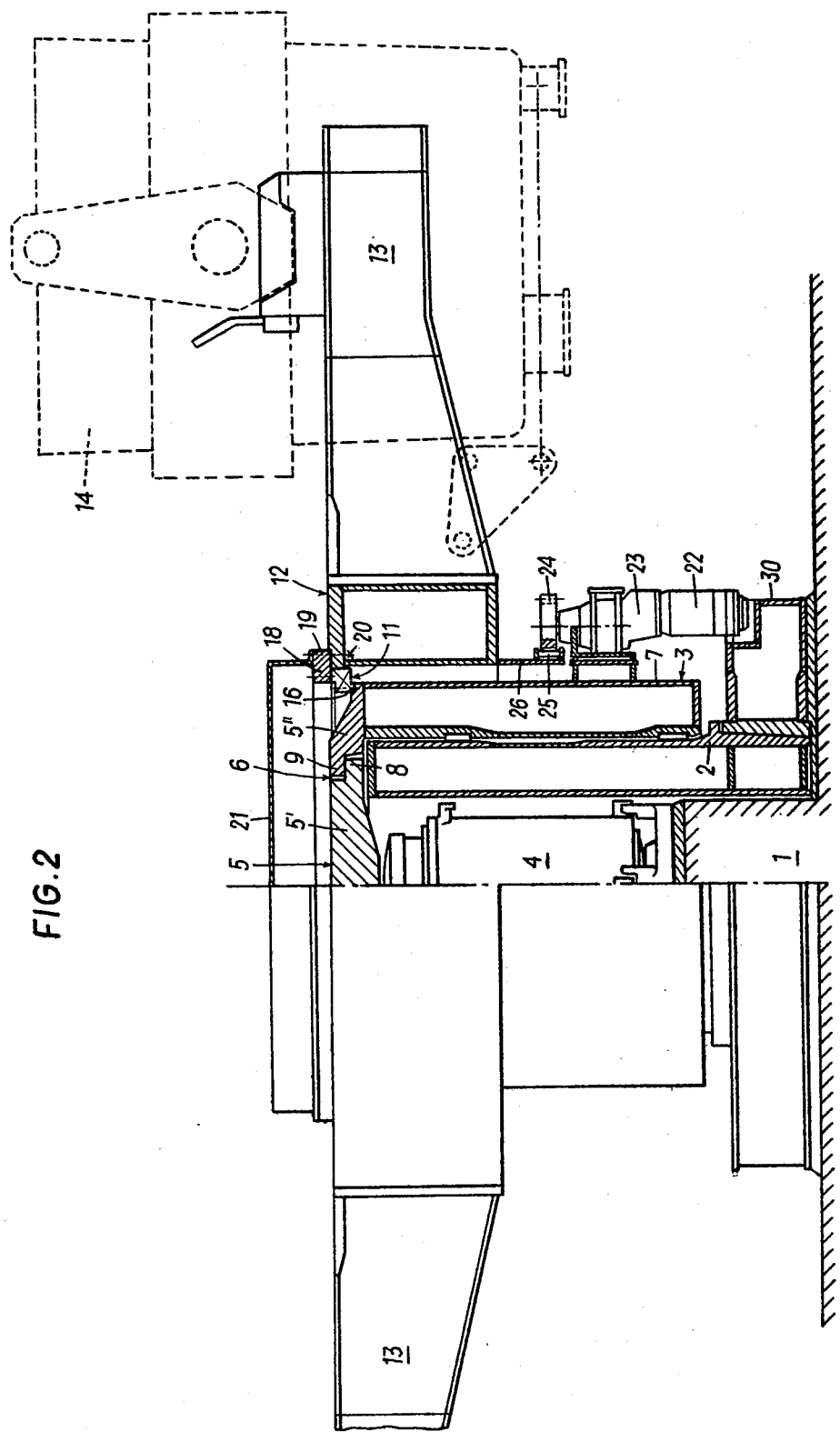
FIG. 2 is a side view partially sectioned along line II—II of FIG. 1.

On a base 1 a stationary part 2 of a carrying column 3 is rigidly mounted. This carrying column is hollow; in its interior a hydraulic cylinder 4 is arranged, which on the one hand is supported on the base 1 and, on the other hand, can be brought into contact with a front plate 5 assembled of two parts 5', 5" by means of a bayonet-type or bayonet connection 6, which front plate carries a part 7 of the carrying column 3 peripherally surrounding the stationary part 2 of this carrying column 3 and being liftable and lowerable relative to the same. The front plate 5 comprises a central circular part 5' from which radially outwardly directed projections 8 project. The radial outer part 5" of the front plate 5 comprises lugs 9 overlapping these projections 8 and welded with the liftable and lowerable part 7 of the carrying column 3. In the peripheral direction, the radially outwardly directed projections 8 are at a distance from one another that is slightly more than the width 10 of the lugs 9 measured in the peripheral direction, so that the central part 5' of the front plate 5 can be lifted by turning the same until the projections 8 come to lie between the lugs 9, the hydraulic cylinder 4 thus being accessible.

On the liftable and lowerable part 7 of the carrying column 3 a carrying arm 12 for two metallurgical vessels is rotatably mounted by means of a pivot bearing 11, which carrying arm comprises diametrically opposite forked arm pairs 13 for laterally embracing two metallurgical vessels. In the drawing one metallurgical vessel 14, i.e. a casting ladle, is illustrated by broken lines when placed on a forked arm pair 13.

According to the invention, a single pivot bearing 11 accommodating tension and pressure forces, such as a roller pivot connection, is provided between this carrying arm and the liftable and lowerable part of the carrying column, this bearing with its bearing inner race 15 resting on a circularly ring-shaped supporting surface 16 of the liftable and lowerable part 7 of the carrying column 3 and being screwed to the same. The bearing outer race 17 of the pivot bearing is screwed with a supporting element 18 designed as an annular flange, the supporting element being placed on top of the bearing outer race with a circularly ring-shaped supporting surface 18'. The carrying arm 12 is mounted so as to be suspended on the annular flange 18, the carrying arm being screwed by means of tension screws 20, with a flange-like part 19 of the annular flange 18 radially outwardly projecting beyond the pivot bearing 11. On the annular flange a hood 21 covering the carrying column 3 is mounted.

As a rotary drive a motor 22 including a gear 23 and a driving pinion 24 is provided on the liftable and lowerable part 7 of the carrying column 3, the pinion 24 engaging in a stub tooth unit 25 mounted to a flange 26 of the carrying arm 12, provided below the carrying arm.

Figure 3:
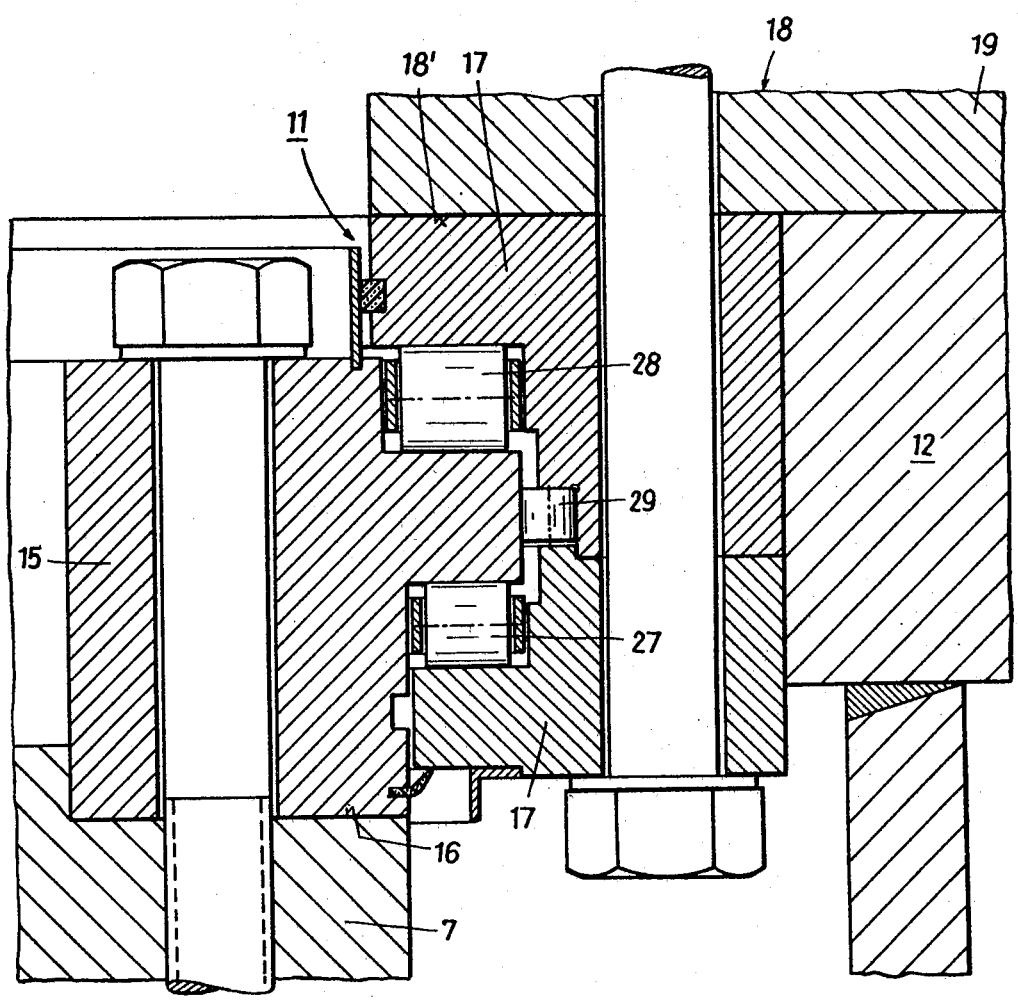
FIG. 3 illustrates a detail of FIG. 1 on an enlarged scale.

As can be seen from FIG. 3, the roller pivot connection 11 is composed of a one-part bearing inner race 15, which is supported on a two-part bearing outer race 17 via two axial roller rows 27, 28 and a radial roller row 29. A roller pivot connection of this kind is particularly suited for high loads, such as metallurgical vessels.

In order to render the pivot bearing 11 accessible, at first the carrying arm 12 is supported vertically by means of lifting elements. To this end, the lifting elements are arranged on a console 30 of the carrying column. Then, the screw connections of the carrying arm with the bearing outer race 17 of the bearing 11 are undone, whereupon the annular flange 18, which is an easily manipulatable part, can be lifted by means of a small mounting crane or any other lifting device. After undoing the screw connection of the inner bearing race 15 with the liftable and lowerable part 7 of the carrying column 3, the bearing 11 can be removed without having to remove the carrying arm 12 from the carrying tower.

The invention is not limited to the exemplary embodiment illustrated in the drawings, but may be modified in various ways. Thus, it is, for instance, possible to use a bayonet-type or bayonet connection between the carrying arm 12 and the supporting element designed as an annular flange 18, instead of the tension screws 20, similar to that provided for the two parts 5', 5" forming the front plate 5. It is also possible to mount the carrying arm 12 so as to be directly suspended on the bearing outer race 17, for instance, by means of stud bolts. In this case the bearing outer race 17 overlaps the carrying arm 12. Furthermore, it is possible to provide two superimposed carrying arms on the carrying column, which are pivotable independently of each other, wherein the internal diameters enabling the passage of the carrying column are chosen to be differently large in order to be able to remove the bearings from above.

What we claim is:

1. In a carrying tower arrangement for a metallurgical vessel, in particular for a casting ladle of a continuous casting plant, of the type including a non-rotatable carrying column, at least one carrying arm cantilevering from said non-rotatable carrying column and pivotable thereabout, at least one metallurgical vessel held by said carrying arm, and a pivot bearing means provided between said carrying column and said carrying arm, the improvement wherein said carrying column comprises a supporting surface on an upper end thereof, and wherein said pivot bearing means comprises a single pivot bearing accommodating axial forces, radial forces and tilting moments, said single pivot bearing including
a first bearing race having a lower-side shoulder resting on said supporting surface,
a second bearing race,
means for mounting said carrying arm so as to be suspended from said second bearing race, and
roller means interposed between said first and second bearing races comprising at least one row of axial rollers and at least one row of radial rollers.

2. In a carrying tower arrangement for a metallurgical vessel, in particular for a casting ladle of a continuous casting plant, of the type including a non-rotatable carrying column, at least one carrying arm cantilevering from said non-rotatable carrying column and pivotable thereabout, at least one metallurgical vessel held by said carrying arm, and a pivot bearing means provided between said carrying column and said carrying arm, the improvement wherein
said carrying tower further comprises a supporting element having a circularly-ring-shaped supporting surface, and wherein
said pivot bearing means comprises a single pivot bearing accommodating axial forces, radial forces and tilting moments, said single pivot bearing means including
a first bearing race having a lower-side shoulder resting on said supporting surface,
a second bearing race having an upper-side shoulder on which said supporting element rests, and
a flange-like part provided on said supporting element and projecting radially outwardly beyond said pivot bearing, said carrying arm being mounted to said flange-like part by tension screws so as to be suspended on said flange-like part.

3. A carrying tower arrangement as set forth in claim 1, further comprising a supporting element having a circularly-ring-shaped supporting surface, and wherein said second bearing race includes an upper-side shoulder on which said supporting element rests, a flange-like part being provided on said supporting element and projecting radially outwardly beyond said pivot bearing, said carrying arm being mounted so as to be suspended on said flange-like part.

4. A carrying tower arrangement as set forth in claims 3 or 2, wherein said supporting element is designed as an annular flange.

5. In a carrying tower arrangement for a metallurgical vessel, in particular for a casting ladle of a continuous casting plant, of the type including a non-rotatable carrying column, at least one carrying arm cantilevering from and pivotable about said non-rotatable carrying column, at least one metallurgical vessel held by said carrying arm, and a pivot bearing means provided between said carrying column and said carrying arm, the improvement wherein a supporting surface is provided on an upper end of said carrying column, and wherein said pivot bearing means comprises a single pivot bearing accommodating axial forces, radial forces and tilting moments, said single pivot bearing including
a first bearing race having a lower-side shoulder resting on said supporting surface,
a second bearing race, including an upper-side shoulder, and
a supporting element having a circularly-ring-shaped supporting surface, said supporting element resting on said upper-side shoulder of said second bearing race and comprising a flange-like part projecting radially outwardly beyond said pivot bearing on which said carrying arm is mounted so as to be suspended therefrom, said carrying arm being mounted to said flange-like part by a bayonet-type connection comprising lugs on said carrying arm which overlap said flange-like part.

6. In a carrying tower arrangement for a metallurgical vessel, in particular for a casting ladle of a continuous casting plant, of the type including a non-rotatable carrying column, at least one carrying arm cantilevering from and pivotable about said non-rotatable carrying column, at least one metallurgical vessel held by said carrying arm, and a pivot bearing means provided between said carrying column and said carrying arm, the improvement wherein a supporting surface is provided on an upper end of said carrying column, and wherein said pivot bearing means comprises a single pivot bearing accommodating axial forces, radial forces and tilting moments, said single pivot bearing including a first bearing race having a lower-side shoulder resting on said supporting surface, a second bearing race, including an upper-side shoulder, and a supporting element having a circularly-ring-shaped supporting surface, said supporting element resting on said upper-side shoulder of said second bearing race and comprising a flange-like part projecting radially outwardly beyond said pivot bearing on which said carrying arm is mounted so as to be suspended therefrom, wherein said pivot bearing comprises a roller pivot connection having a bearing inner race releasably fastened to said non-rotatable carrying column and a bearing outer race releasably fastened to said supporting element.

* * * * *